United States Patent [19]

Gust

[11] Patent Number: 4,986,122

[45] Date of Patent: Jan. 22, 1991

[54] FLUID VELOCITY MEASUREMENT INSTRUMENT

[75] Inventor: Giselher R. Gust, St. Petersburg, Fla.

[73] Assignee: Hydro Data Inc., St. Petersburg, Fla.

[21] Appl. No.: 434,867

[22] Filed: Nov. 8, 1989

[51] Int. Cl.$^5$ .................... G01F 1/68; G01F 25/00

[52] U.S. Cl. ........................ 73/204.15; 73/3; 73/204.26

[58] Field of Search ............ 73/204.26, 3, 147, 204.15

[56] References Cited

U.S. PATENT DOCUMENTS

| | | | |
|---|---|---|---|
| 4,214,478 | 7/1980 | Lauterbach | 73/204.15 |
| 4,304,130 | 12/1981 | Peter et al. | 73/204.15 |
| 4,399,697 | 8/1983 | Kohama et al. | 73/204.16 |
| 4,843,882 | 7/1989 | Ohta et al. | 73/204.26 |
| 4,870,860 | 10/1989 | Ohta et al. | 73/204.26 |

*Primary Examiner*—Donald O. Woodiel

[57] ABSTRACT

A method and apparatus is provided to measure in fluids including suspensions and heterogeneous mixtures time-resolved histories of velocity magnitude and vector of unidirectional, unsteady and oscillating flows. A boundary layer develops from a sharp, leading edge of a plate approached by fluid flow. Its skin friction, measured at a fixed location on the plate by a hot-film sensor connected to a constant-temperature anemometer, is uniquely related to the magnitude of the approach velocity. Temperature-sensing gauges within the range of the thermal wake from the skin friction sensor allow to determine direction of the flow.

20 Claims, 7 Drawing Sheets

FLUID VELOCITY MEASUREMENT INSTRUMENT

BACKGROUND OF THE INVENTION

1. Field of the Invention

The invention relates to gauges for measuring one- and two-dimensional time-resolved velocities of steady, unsteady and oscillatory nature in both laminar and turbulent fluid flows. More particularly, it refers to an instrument for resolving the magnitude of velocity and two-dimensional velocity vectors through different embodiments in standard and hostile fluid environments such as abrasive suspensions, slurries, and highly corrosive discharges typically found in geothermal wells, oil wells or hydrothermal vents.

2. Description of the Prior Art

Flows encompass turbulent, laminar, steady, unsteady, or reversing movements of fluids. To quantify their velocity, adequate size and frequency responses of velocity probes are necessary to resolve the flow-inherent scales, both in frequency domain and wavenumber space. Customarily more than one velocity sensor is needed to cover the range of time variability in natural flows ranging from rivers to oceanic applications as well as in engineering projects. Complications may arise in the field, where fluids are often not as clean or homogeneous as experienced in aerodynamic and fluid dynamic laboratory set ups. Instead, the fluids are frequently multi-phase mixtures composed of suspensions of cohesive, cohesionless or mixed sediments from low to high concentrations, containing also biological solutes, bacteria, and gases. Exudates and debris might as well be included. Even liquid-gas or liquid-liquid mixtures may be present. As a result, sophisticated measuring techniques usable in laboratory flows such as optical or acoustical velocity transducers may not be applicable in the field due to ambiguous calibration relationships in heterogeneous mixtures of biotic and abiotic origins, difficulties to deploy or mount the probes and associated electronics, or attrition and corrosion of the device by the fluid. Latter is particularly true when high-pressure, high-temperature, chemically aggressive flows are to be investigated such as discharges from hydrothermal or geothermal vents (on the ocean floor), or from oil wells. A velocity gauge is needed to resolve one or two-dimensional motions with adequate spatial and temporal responses to provide instantaneous speed and velocity vectors not only in homogeneous fluids but also in aggressive, hostile and suspension-bearing flows such as hydrothermal vents, oil wells, slurries, fluid muds and natural suspensions with steady, unsteady and oscillatory time histories. The term 'instantaneous' is used to define short-term averaged signals of durations comparable to or shorter than fluctuations in the flow representing at least 90% of the turbulent kinetic-energy frequency spectrum.

SUMMARY OF THE INVENTION

The invention provides a gauge for measuring whereby the wall shearing stress in a boundary layer developing from an edge along the surface of an obstacle, such as a sharp-edged short plate. The measurement is made at a fixed downstream position relative to the edge by a flush-mounted hot-film sensor or a flat-surfaced thermistor utilizing constant-temperature anemometry. This wall shearing stress (also called skin friction) is uniquely related to the approach velocity at the leading edge through a fundamental heat-transfer equation. By proper selection of the wall shearing stress sensor, magnitudes of velocity vectors can be resolved in unidirectional flows. Heat-sensing devices placed in addition circumfencially around the skin friction element can be used to indicate direction of the flow, and when combined with the speed data the full velocity vector can be obtained for steady, unsteady, separating, as well as oscillatory flows in the plane of the gauge's surface. Heat loss from the skin friction element heated to (at least) a few degrees above ambient temperature, is proportional to the strength of the flow; its replenishment through the connected hot-film or thermistor constant-temperature electronics generates the flow-related output voltage.

BRIEF DESCRIPTION OF THE DRAWINGS

The invention may be best understood by those having ordinary skill in the art by reference to the following detailed description when considered in conjunction with the accompanying drawings, in which.

DETAILED DESCRIPTION OF THE INVENTION

Figure 1:
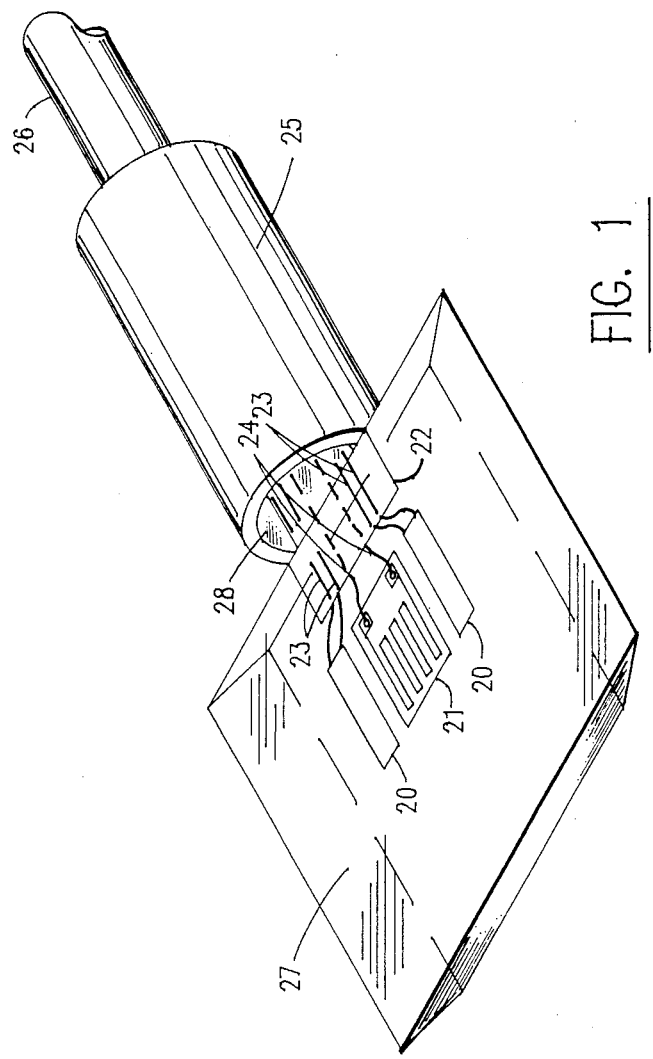
FIG. 1 is a perspective view of a basic flat-plate gauge design with direction discriminators, constructed in accordance with this invention.

Throughout the following detailed description, the same reference numerals refer to the same elements in all figures. All of the individual gages shown in the figures and described in the examples have the same underlying principle. A plate (or other obstacle geometry) with a sharp leading edge is secured in the path of a fluid, with the leading edge of the plate facing the oncoming fluid. The leading edge initiates the development of a boundary layer in the direction of the flow over the plate surface. The relevant boundary-layer parameters are the characteristics of the approach velocity, and geometry and alignment of the plate. With most of the latter being determined by the gage dimension and sensor element location, the one parameter uniquely related to the hydrodynamics of the boundary-layer (and varying downstream with distance from the leading edge) is the wall shearing stress. When a wall shearing stress sensor, also referred to as skin friction element, is positioned at a fixed distance $\Delta x$ downstream from the leading edge, then the skin friction sensor output is uniquely related to the approach velocity $u_a$ per particular fluid. The measurement of the skin friction is done by utilizing constant-temperature anemometry electronics in connection with the sensor element. The sensor as part of a Wheatstone bridge with feedback loop is heated to an elevated temperature, and as the wall shearing stress over the element increases with increasing flow, increased amounts of heat are transported away and the electronics provide more electrical current to maintain the sensor's elevated temperature, preselected through the wall overheat ratio. The bridge current and subsequently the electronics output voltage respond to the wall shearing stress in the boundary layer, which in turn depends on the approach velocity at the leading edge. The velocity of the fluid flow may thus be determined mathematically (and confirmed through experimental calibrations) by equations well known in the field of fluid mechanics. The boundary layer developing from the leading edge does not need to be that of a plate held fixed in space. While this will be mostly the case, applications are possible where movements of gauge (for example, linear or rotational) and of fluid are vectorially superimposed, generating a composite relative velocity in an assortment of paths to be analyzed subsequently through proper data reduction software. In such cases the location of the leading edge will move along the circumference of the plate, and edge-sensor element distance x may vary. In addition, the gauge geometry does not need to be that of a simple flat plate. Boundary layers developing from leading edges along the outside of (streamlined) bodies, or from the inside of tubes, ducts or other hollow geometries can be used as long as the developing boundary layer is bounded by the wall surface (bottom) and the core flow (top) at the location of the skin friction element. That means, the measuring principle holds as long as the boundary layer developing in the longitudinal axis of the skin friction element in hollow geometries or over a gauge positioned near a wall has not coalesced with the boundary layer developing simultaneously on the opposing wall surface to form a fully developed pipe/duct flow at the sensor's location.

In describing the gauge, emphasis is not put on the details of the operation of constant-temperature hot-film or thermistor anemometry, which is current knowledge. The gauges presented here also function with constant-current anemometer electronics. The items to be emphasized, however, are that:

1. material with low thermal conductivity should be the preferred choice for the support plate, 2. the anemometry electronics may provide temperature compensation circuitry in flows with varying temperature, 3. thermal interference effects due to inserting a heated source (the gauge) into a wall as reported for skin friction measurements in wall-bounded shear flows will be minimal yet may be possible in the described applications depending on the history of temperature in the flow, 4. for water flows the exponential coefficients derived from laminar calibration curves of skin friction probes can be used to calculate (within adequate error uncertainties $\leq 5\%$) the instantaneous turbulent wall shearing stress, although due to the protective epoxy insulation on the sensor surface the frequency response of the sensor element is affected and third and fourth moments of the flow are not properly measured. The measured skin friction time histories in turn permit to resolve time histories of approach velocity $u_a$ at the leading edge.

The gauge of FIG. 1 consists of a thin rectangular blade with bevelled edges (27) and an epoxy-sealed hot-film element (21) attached to that surface from which the bevelled edges recede. The lead wires (24) from the skin-friction element are sealed inside a small milled groove (22) and soldered to appropriate (underwater) cable (26) inside a shaft (25) which is sealed with epoxy (28) and also serves mounting purposes. The cable (26) leads to the electronics circuitry contained elsewhere (e.g., in a pressure vessel for field use). For measuring speed in a unidirectional flow (shown by arrow), it is only necessary to activate the hot-film element connected via the cable (26) to the anemometry electronics. The magnitude of the flow is measured by the amount of heat removed from (and replenished to) the heated sensor surface in the following manner: The amount of heat transferred through forced convection from the sensor surface to the fluid yields the wall shearing stress based on equation (1) at the location of the flush-mounted element (21), being a distance $\Delta x$ away from the leading edge in downstream direction of the developing wall boundary layer. Its value is uniquely related to the approach velocity $u_a$ at the leading edge via the equations (2) for turbulent, and (3) for laminar flows:

$$\tau^{\frac{1}{2}} = (QLW/k\Delta T_0)(a^{\frac{1}{2}}WL^{\frac{1}{2}})^{-1}(\mu v/\sigma)^{\frac{1}{2}} \tag{1}$$

$$u_a = 7.15(\tau/\rho)^{0.5556}(\Delta x/v)^{0.1111} \text{ (turbulent flow)} \tag{2}$$

$$u_a = 0.4698\tau^{0.3333}[(\tau\Delta x)/(\mu\rho)]^{0.3333} \text{ (laminar flow)} \tag{3}$$

where a = a constant for given temperature gradient and flow type; L, W are effective length and width of sensor, respectively, Q is heat flux, k is thermal conductivity, $\mu$ is dynamic viscosity, $v$ is kinematic viscosity, $\sigma$ is Prandtl number, $\tau$ is skin friction, $\rho$ is fluid density, $\Delta x$ is distance edge-sensor location, and $\Delta T_0$ is the temperature gradient determined by the overheat ratio.

The decision to use either the laminar or the turbulent-flow equation to calculate the approach velocity via calibration coefficients from the anemometer output signal is made visually or computer-monitored from the nature of the output signal, which differs distinctly between laminar and turbulent flow, and/or the estimate of the Reynolds number of the flow. When vector or 2-dimensional measurements are desired, heat-sensing elements (20) such as temperature-dependent resistors (or thermocouples) need to be placed adjacent to element (21). Changes in the output signal of these detectors occur when the thermal wake generated by element (21) reaches a temperature indicator (20) connected via lead wires (23) and multi-lead cable (26) to the processing electronics (not shown). Through a computer program analyzing in anti-coincidence mode simultaneously thermal sensors (20) on opposing sides of element (21), the direction of the flow is determined for each time step.

The gauge can be held in any orientation relative to the flow, even upside down, and if non-aligned with the flow, the sensor element (21) measures the flow components of fluid moving in the plane of its surface. For particular applications with slowly varying (e.g. tidal) or low-magnitude (e.g. hypolimnion) flows it may be advantageous to mount the gauge on a vane or a gauge each on the ends of a centrally rotating outrigger arm.

Figure 2:
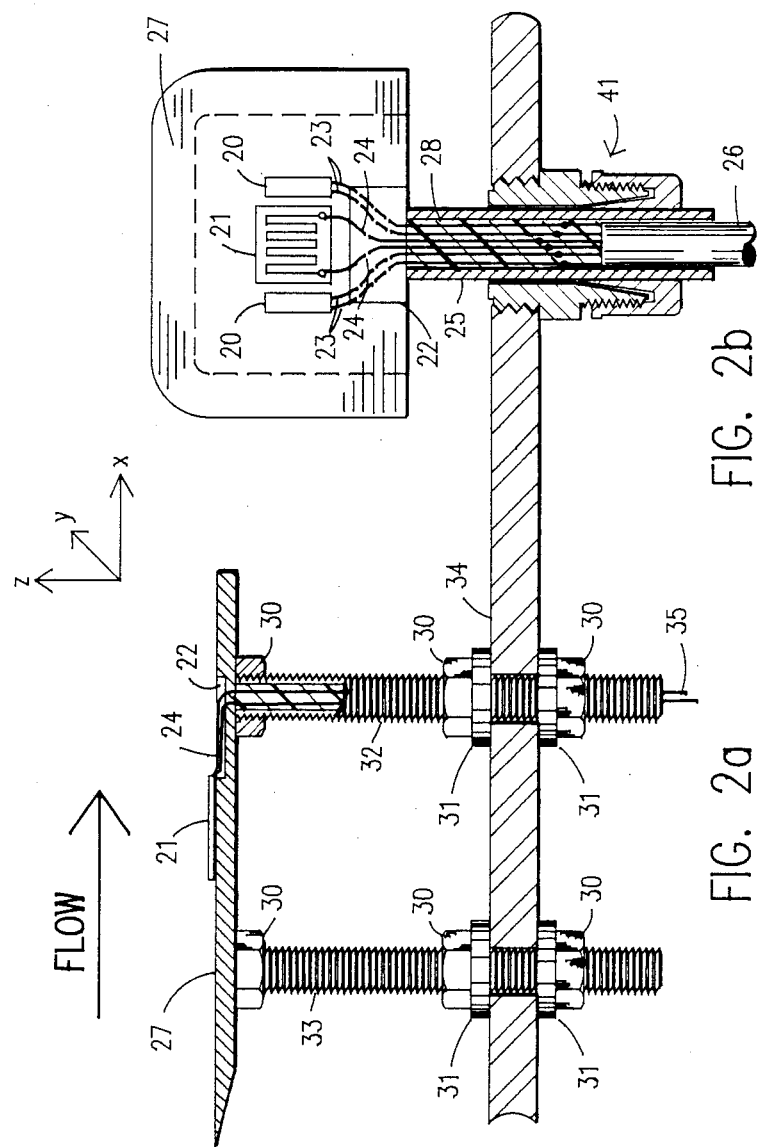
FIG. 2 is a side view of two gauges constructed in accordance with FIG. 1 held fixed in position by different wall mountings without (FIG. 2a) and with (FIG. 2b) direction discriminators.

FIG. 2 demonstrates in a side view examples of mounting the velocity gauge on a wall (34). In FIG. 2a the gauge measures the speed in the x-y plane, and the support plate carrying the skin friction element (21) is held in place by several threaded rods (32, 33), the length of which determines the gauge's measuring height. The rods (32, 33) are attached to the back of the support plate (27) through glued-on nuts (30). The sensor-element leads (24) are soldered to thin, flexible, isolated wire pairs (35) and guided through a (later epoxy-sealed) groove (22) on the plate (27) to the hollow threaded rod (32) through which the cable leads to the constant-temperature anemometer electronics located elsewhere. Sealing washers (31) placed beneath the nuts (30) prevent leakage from the wall holes for the rods. In FIG. 2b, the gauge measures the forward-backward velocity vector in the x-z plane by having thermocouples (20) placed immediately in front and behind the skin friction element (21). The gauge's surface plate (27) ends in a shaft (25), made of an epoxy tube, which serves a dual purpose: Firstly, its outer diameter fits a compression fitting (41) attached to the wall (34), thus providing the means to hold the gauge at a desired measuring height. Secondly, the leads of skin friction sensor (24) and of the thermocouples (23) feed through resealed grooves (22) on the support plate (27) directly into the hollow shaft (25) sealed with epoxy (28) after they are soldered to the proper multi-wire underwater cable (28) leading to the electronics boards (not shown).

Figure 3:
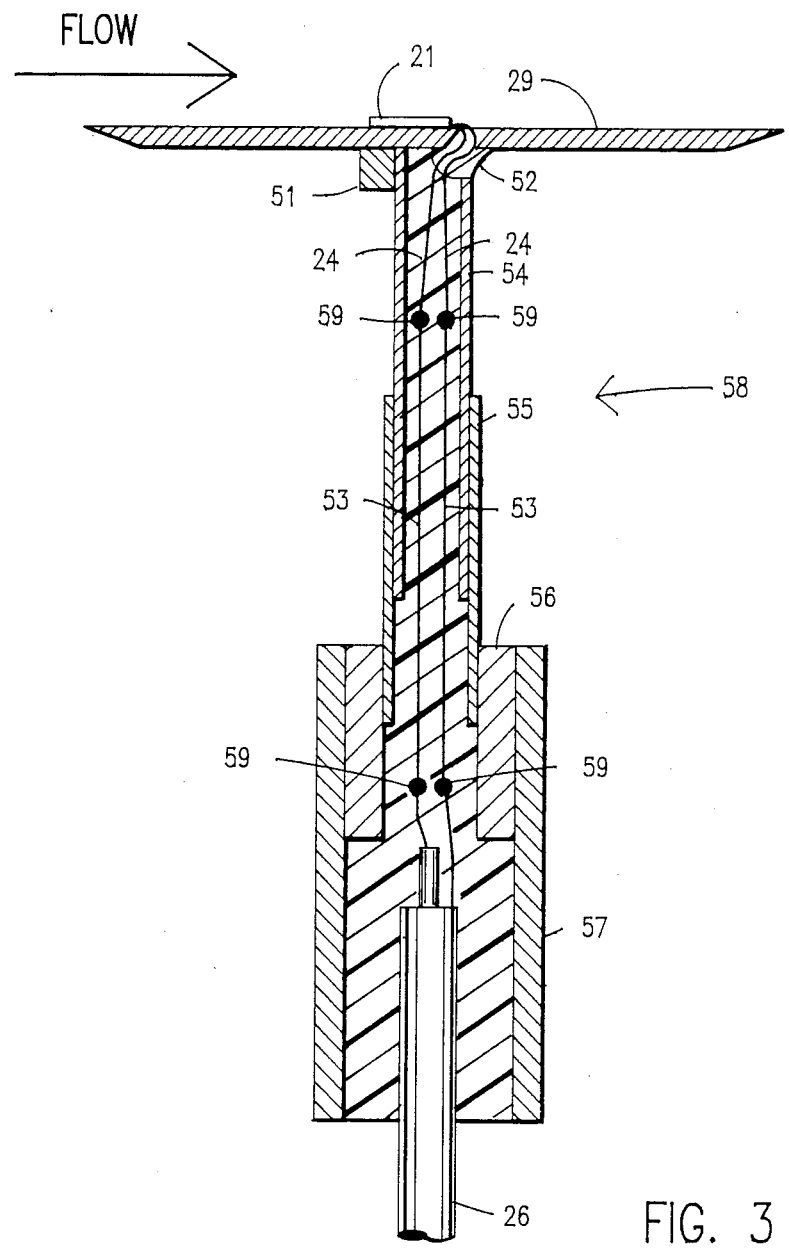
FIG. 3 is a side view of a gauge with circular shape, permitting omnidirectional measurement of flow speed in the plane of the plate.

In FIG. 3, the gauge consists of a circular plate (29) with a circumfencially bevelled edge receding from the surface carrying the skin friction sensor element (21) in its center. Thus the distance x between edge and sensor element (21) is the same from all directions. The boundary layer developing over the plate is the same for flows approaching from any horizontal direction. The speed signal generated by the skin friction sensor element (21), which has omnidirectional calibration characteristics, is then the same for velocity vectors in the plane of the plate (29). The leads (24) from the sensor element are fed through sealed small holes into the center stem assembly (58), where they are connected by solder joints (59) to thin stranded, PVC-coated wire leads (53). This stem (58) consists of staggered hollow tubes (54, 55, 56, 57) of the same material as the round plate (here heat-resistant epoxy tubing, type G-10), which is stepwise filled with epoxy during construction. The thinnest tubing is attached with epoxy to the circular plate (29) with a segmented collar (51) giving additional mechanical stability to the glued joint and an extrusion of cured epoxy (52) closing the collar (51) after the sensor wires were soldered onto leads (53). This design reduces flow blocking in the vicinity of the plate. The stem then increases its diameter towards the shaft end where leads (53) are soldered to cable (26) connecting the gauge to the electronics. The cable (26) is either underwater cable or coaxial cable covered by an additional layer of shrink tubing. Cables with other materials are feasible in applications requiring particular chemical and/or heat resistance, however, their impedance has to prevent oscillations of the anemometer electronics.

Figure 4:
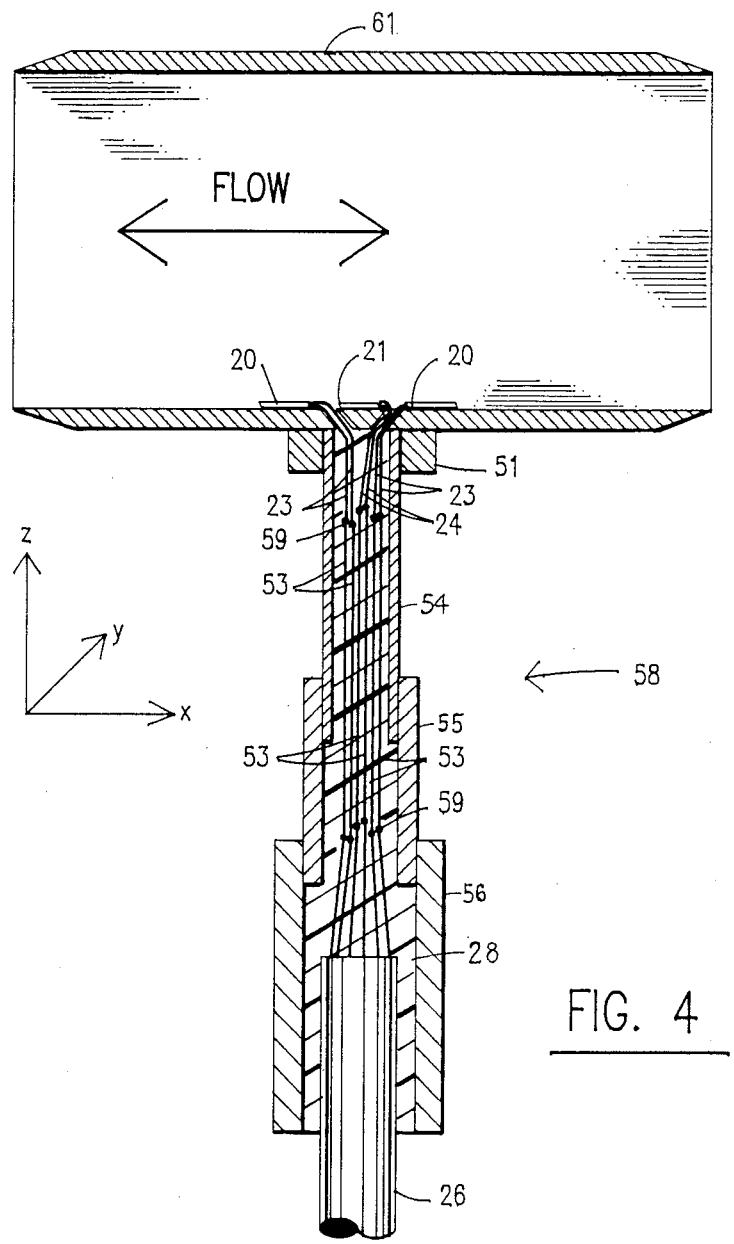
FIG. 4 is a side view of a gauge where the skin friction sensor and directional discriminators are mounted inside a short tube such that unidirectional, oscillatory and reversing flows can be monitored.

In FIG. 4, boundary layers are initiated by the bevelled rim on the inside and outside surface of a thin-walled tube (61) with diameter d and length l. This geometry represents a flat plate bent into circular shape. Using the inner surface, the skin friction element (21) is mounted centrally such that the same distance $\Delta x$ is given from either rim of the tube (61). This distance is short enough that the axial-symmetric boundary layer has not grown to a height $>d/2$ such that it coalesces in the centerline. Note that if latter occurs, the flow has developed into a fully developed pipe flow and the skin friction element measures the wall shearing stress of a pressure-driven pipe flow and is not related to the approach velocity $u_a$ at the leading edge any more. Next to the skin friction element (21) in the upstream and downstream direction, heat-sensing elements (20) are mounted which permit to distinguish between forward and backward direction of the flow moving through the tube in unidirectional, oscillating or reversing flows. Their leads (23) as well as those (24) of the skin friction sensor element are sealed and fed into the hollow shaft assembly (58) with staggering diameter, where they are connected to pairs of thin, stranded, PVC-coated lead wire (53) which in turn are soldered to a multi-conductor cable (26) which leads to the electronics housing not shown. The shaft is filled with epoxy (28), cured under vacuum for proper degassing to provide adequate pressure-proof seals of the electrical leads and solder joints (59). All gauges of FIGS. 1–5 are deployable in deep-sea environments up to 10,000 psi with the anemometry electronics and digital data recorder as commercial products stored in a self-contained pressure vessel.

Figure 5:
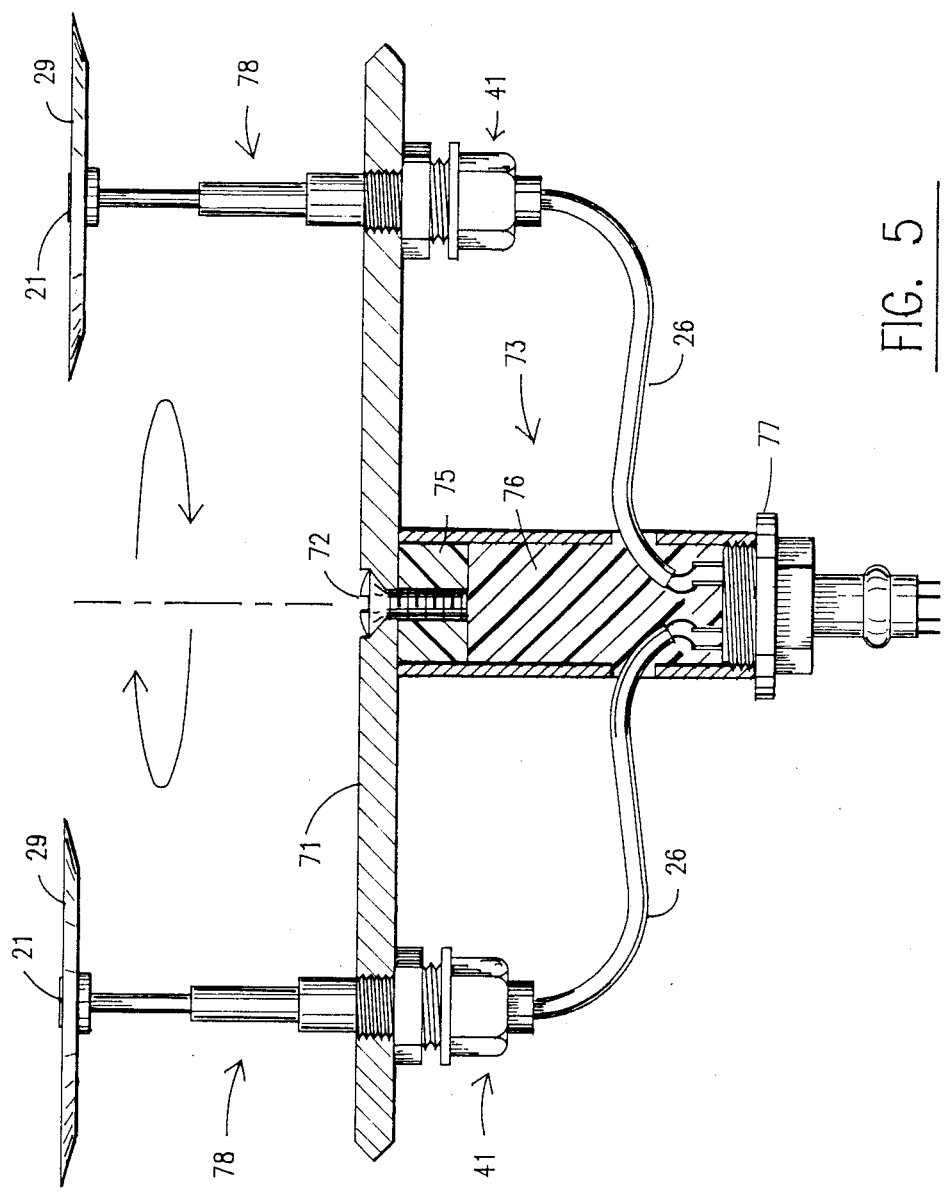
FIG. 5 is the side view of two omnidirectional speed gauges as shown in FIG. 3, mounted on an outrigger arm which rotates around its center axis.

The device shown in FIG. 5 utilizes two of the omnidirectional gauges shown in FIG. 3. They are mounted with compression fittings (41) at the ends of a streamlined connecting distance rod (71), which can rotate around its vertical center axis. A short vertical shaft assembly (73) is attached via a screw (72) in the center of the distance rod. It consists of an epoxy plug (75) with central, threaded hole, an epoxy tube (74) and ends in a 4-pin underwater connector (77). Plug (77) provides the mechanical and electrical connection to a sealed drive shaft with receptacle plug, which emerges from a pressure vessel (for field use) or wall attachment containing all necessary electronics, motor, slip ring, microprocessor, data acquisition and storage means. Latter items and mounting cage for field deployments are not shown here since they are part of known, current technology. For laboratory use the shaft is fed through an opening in the wall using current sealing technology. Turning the shaft assembly (73) at a constant angular frequency $\omega$ with no superimposed flow generates for both gauges (78) the same, constant output signal representative of the given angular velocity. With superimposed environmental flow, these outPut signals become modulated since the two velocities are adding up vectorially, and a phase relationship exists between the signal outputs from the two gauges. Changes of direction of the flow result in changes of the phase of the output signals, while changes in speed change the signal amplitude. The frequency of the composite signal per gauge (78) is determined by the rotation speed of the distance rod (71). The device of FIG. 5 is particularly favorable for the measurement of very low velocities and of transients. The waterproof electrical cables (26) from the shafts of the two omnidirectional gauges (78) are fed to the underwater connector (77) through holes in the initially hollow center shaft, sealed with epoxy (76) after the solder connections between leads and pins have been made. Applications are envisioned where a modified version of this device is used with only one gauge rotating with fixed angular velocity at a distance Δr around the vertical shaft.

Depending on the application, various materials and shapes of the obstacle are selectable from whose edge or rim the boundary layers develop. As to environmental conditions, the sensors have been used in air flows, laboratory water flows, suspensions of cohesive and cohesionless sediments with concentrations up to 130 g/l, deep (5000 m) and shallow oceanic flows.

Sensors and materials, used in these designs, have been pressure-tested to 10,000 psi and have a temperature range up to 250° C., which permits use in fluids heated up to 200° C. Temperatures up to 350° C. have been reported in particular types of hydrothermal vents, and for measuring their discharge velocities, materials for temperatures up to 550° C. have been located for gauge items such as skin friction sensor element, boundary-layer generating obstacle, sensor leads, cables and sealing material. However, the self-contained pressure vessel with electronics and data recorder has to be placed in a cooler environment, which is possible through approaches known and utilized in present-day technology.

Another application utilizes the fact that for heterogeneous fluid mixtures such as oil/water or oil/water/gas, the skin friction output signal contains information which permits to determine the volume ratios of the single fluid components present. This is possible when for the same velocity the thermal conductivity, being an essential part of the fundamental heat transfer equation, is different for the co-existing fluids. Changes in nature and amplitude of the anemometer output signal are the result, from which volume ratios can be estimated.

The gauges described above act as velocity sensors only as long as the skin friction element is placed at a location where the boundary layer is developing from a leading edge. That means, if the short tube of FIG. 4 is placed, for example, with a different shaft attachment into a well of nearly the same diameter with a pre-existing velocity profile and discharge volume, then the instrument will measure a wall shearing stress related to that pre-existing flow. This is due to the fact that the gauge has blended into the surrounding and no leading edge cutting the flow exists any more. Likewise, a gauge with flat Plate measures the approach flow velocity $u_a$ only when it is not resting flush on a surface; that is, fluid must move beneath and on top of the plate (small areas of support beneath plate are permissible). Flow depth at gauge location has to be considered for proper gauge performance. The top of the boundary layer developing from the leading edge of the plate should not interact with or be affected by other obstacles located close to the plate. However, operating principles and calibrations of the gauge are not affected when the plate surface which carries the skin friction element is turned upside down or positioned in any desired plane in space facing the flow (see examples of FIG. 2) and interfering boundary layers from other surfaces are absent.

Figure 6:
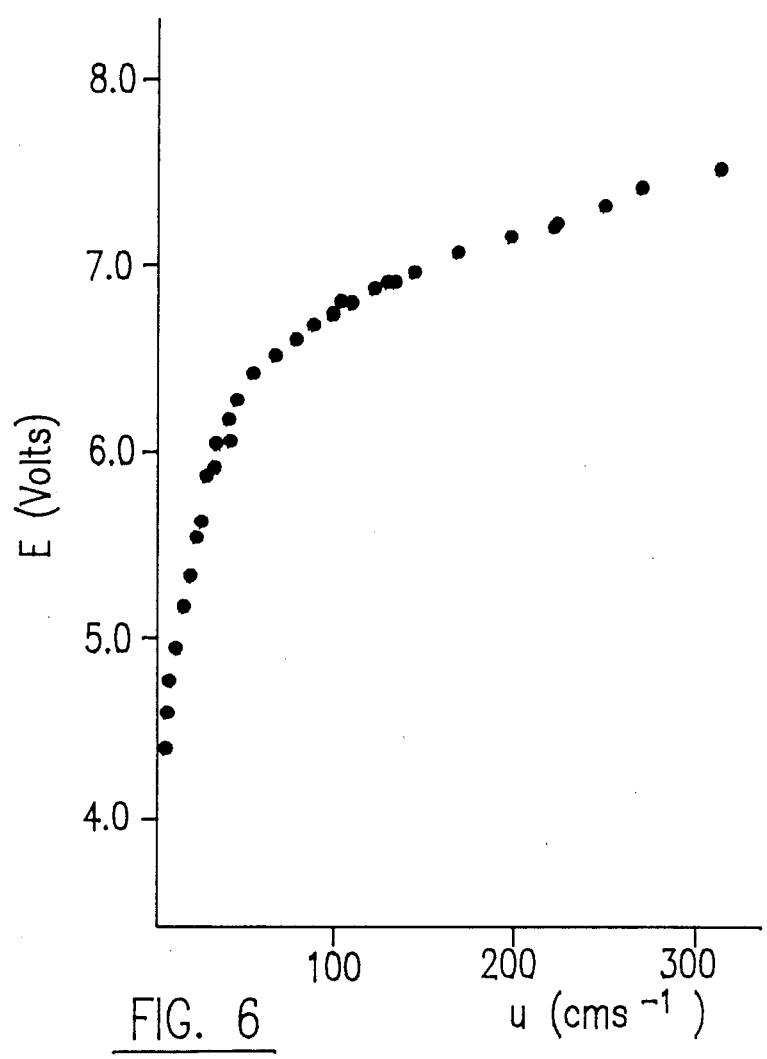
FIG. 6 is a graph of a typical calibration curve for unidirectional flow with the gage of FIG. 1 connected to a constant-temperature anemometer.
Figure 7:
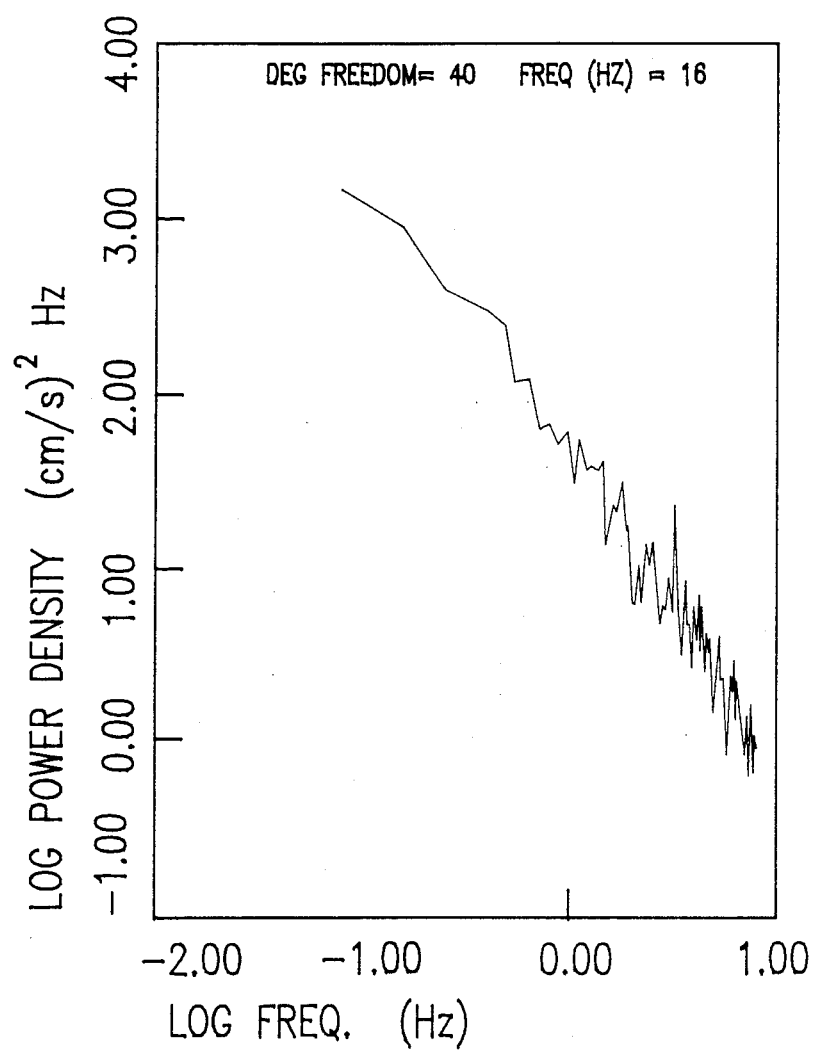
FIG. 7 is a graph of the power spectral density calculated from a unidirectional velocity time series measured with the gauge of FIG. 1 in a wall-bounded shear flow.

Particular examples of the gauge utilizing the invention are described below, with details of the direction discrimination analysis described in Gust and Loy (1989). FIG. 6 shows a typical calibration curve for the speed of a unidirectional aquatic flow, while FIG. 7 displays a graph of the spectral power density calculated from a velocity time series acquired in a wall-bounded water flow with a gauge as shown in FIG. 2b connected to a constant-temperature anemometer.

EXAMPLE 1

Design: See FIG. 2a
Dimensions of plate: 2.8 cm length×3.2 cm width×0.18 cm height
Material of plate: epoxy board with copper backing
Type of sealing epoxy: Devcon 2 ton, 2-component epoxy
Shaft: epoxy tubing G-10, 4 cm length×0.95 cm o.d.
Skin friction sensor: Measurements Group, model WTG 50A epoxy-encapsulated nickel grid 50 ohms resistance at 20° C.
  nickel grid size: 1.5 mm×2.5 mm
  thickness of sensor: 0.1 mm
  thickness of top epoxy insulation: 0.025 mm
  frequency response (dynamic): ≦20 Hz
Calibration range: max. 4 m/s
(Note: Higher speeds possible, not calibrated yet)
Applications (so far): flows of air, water, seawater, cohesive and cohesionless sediment suspensions up to 130 g/l, fibrous suspensions, gravel
Anemometer: DANTEC model 55M01 (constant-temperature mode)

EXAMPLE 2

Design: See FIG. 3
Dimensions of plate: circular, 3.2 cm diameter
Material of plate: epoxy board, type G-10
Type of sealing epoxy: marine 2-component epoxy
Shaft: epoxy tubing G-10, 15 cm length, 0.35 to 1.25 cm o.d.
Skin friction sensor: Measurements Group, model WTG 50A epoxy-encapsulated nickel grid 50 ohms resistance at 20° C.
  nickel grid size: 1.5 mm×2.5 mm
  thickness of sensor : 0.1 mm
  thickness of top epoxy insulation: 0.025 mm
  frequency response (dynamic): ≦20 Hz
Note: Due to layout of nickel grid, sensor responds omnidirectional
Calibration range: $0.002 < u < 4.0$ m/s
Applications (so far): flows of water, seawater, cohesive sediment suspensions
Anemometer: Thermo Systems Inc, model 1610 Y (constant-temPerature mode)

EXAMPLE 3

Design: See FIG. 4
Dimension of tube: 2.54 cm i.d.×2.88 cm o.d. x4 cm length
Material of tube: epoxy, type G-10
Type of sealing epoxy: marine 2-component epoxy
Shaft: epoxy tubing G-10, 15 cm length, 0.35 to 1.25 cm o.d.
Skin friction sensor: Measurements Group, model WTG 50A epoxy-encapsulated nickel grid 50 ohms resistance at 20° C.
  nickel grid size: 1.5 mm×2.5 mm
  thickness of sensor: 0.1 mm
  thickness of insulating top layer: 0.025 mm
  frequency response <20 Hz
Calibration range: $0.01 < u < 2$ m/s
Anemometer: DANTEC 55 M01 (constant-tempature mode)

In view of the above description and examples it is likely that modifications and improvements will occur to those skilled in the art to which this invention pertains which are within the scope of the appended claims.

Having thus described the invention what is claimed is:

1. A method of determining time-resolved measurements of magnitude and vector of velocity in laminar and turbulent fluid flows, said method comprising the steps of:
    forming a composite gauge by mounting a skin friction sensor element on a smooth surface of an electrically insulated flat plate of low thermal conductivity with bevelled edge, and placing an assortment of thermal indicators around it being within the thermal field of influence if located downstream of the thermal wake of the heated skin friction element, said elements being flush with said surface,
    connecting said gauge to a bridge circuit having means connected thereto to maintain the temperature or current of the skin friction element,
    connecting said gauge additionally to electronics having means connected thereto to convert temperature changes of thermal indicators adjacent to the skin friction element into voltage signals and to monitor these signals,
    mounting said gauge in a calibration device having known flow, temperature, fluid characteristics, and controlled values of velocity,
    relating said voltage outputs to known values of velocity, direction, and fluid composition in said calibration facility, and obtaining calibration curves which relate magnitude of the flow of selected fluids to the voltage output of the anemometer, direction of the flow to the voltage output of the thermal indicator electronics, and volume fractions of heterogeneous fluid mixtures to the voltage output of the anemometer (where applicable),
    removing said gauge from said calibration facility,
    mounting said gauge in a fluid flow to be tested with the leading edge facing the flow, either at a fixed location or moving relative to the fluid flow in a known path and time pattern,
    providing fluid flow relative to the gauge,
    measuring flow magnitude and direction of flow with said calibrated gauge, and volume fractions of co-existing constituents of heterogeneous mixtures (where applicable).

2. The method recited in claim 1, wherein the plate geometry is circular instead of rectangular.

3. The method recited in claim 1, wherein the plate geometry can be that of a streamlined body with leading edge in the direction of the approaching flow.

4. The method recited in claim 1, wherein the boundary layers develop inside hollow devices (tubes, ducts) from bevelled rims.

5. The method recited in claim 1, wherein the gauge rotates at known angular velocity at a distance r around an axis.

6. The method recited in claim 1, wherein two gauges mounted each at opposing ends of a connecting rod rotate in the plane of the rod around its center at known angular velocity.

7. The method recited in claim 1, wherein the volume fractions of fluids co-existing as heterogeneous mixture in a flow are determined.

8. The method recited in claim 1, wherein no direction indicators are used.

9. The method recited in claim 1, wherein constant-temperature anemometry is used.

10. The method recited in claim 1, wherein constant-current anemometry is used.

11. A gauge for time-resolved measurements of magnitude and vector of velocity in laminar and turbulent fluid flows, said gauge comprising
    a composite gauge having a skin friction sensor element on a smooth surface of an electrically insulated flat plate of low thermal conductivity with bevelled edge, and an assortment of thermal indicators around it being within the thermal field of influence located downstream of the thermal wake of the heated skin friction element, said elements being flush with said surface,
    said probe connected to a bridge circuit having means connected thereto to maintain the temperature or current of the skin friction element,
    said probe connected additionally to electronics having means connected thereto to convert temperature changes of thermal indicators adjacent to the skin friction element into voltage signals and to monitor these signals,
    said gauge mounted in a calibration device having known flow, temperature, fluid characteristics, and controlled values of velocity,
    said voltage outputs related to known values of velocity, direction, and fluid composition in said calibration facility, and obtaining calibration curves which relate magnitude of the flow of selected fluids to the voltage output of the anemometer, direction of the flow of selected fluids to the voltage output of the thermal indicator electronics, and volume fractions of heterogeneous fluid mixtures to the voltage output of the anemometer (where applicable),
    removing said gauge from said calibration facility,
    mounting said gauge in a fluid flow to be tested with the leading edge facing the flow, either at a fixed location or moving relative to the fluid flow in a known path and time pattern,
    providing fluid flow relative to the gauge,
    measuring flow magnitude and direction of flow with said calibrated gauge, and volume fractions of co-existing constituents of heterogeneous mixtures (where applicable).

12. The gauge recited in claim 11, wherein the plate geometry is circular instead of rectangular.

13. The gauge recited in claim 11, wherein the plate geometry can be that of a streamlined body with leading edge in the direction of the approaching flow.

14. The gauge recited in claim 11, wherein the boundary layers develop inside hollow devices (tubes, ducts) from bevelled rims.

15. The gauge recited in claim 11, wherein the gauge rotates at known angular velocity at a distance r around an axis.

16. The gauge recited in claim 11, wherein two gauges mounted each at opposing ends of a connecting rod rotate in the plane of the rod around its center at known angular velocity.

17. The gauge recited in claim 11, wherein the volume fractions of fluids co-existing as heterogeneous mixture in a flow are determined.

18. The gauge recited in claim 11, wherein no direction indicators are used.

19. The gauge recited in claim 11, wherein constant-temperature anemometry is used.

20. The gauge recited in claim 11, wherein constant-current anemometry is used.

* * * * *